March 31, 1953 P. J. GIVENS 2,633,326
VALVE
Filed March 6, 1946 2 SHEETS—SHEET 1

INVENTOR.
Perry J. Givens
BY
E. V. Hardway
ATTORNEY

March 31, 1953 P. J. GIVENS 2,633,326
VALVE
Filed March 6, 1946 2 SHEETS—SHEET 2

INVENTOR.
Perry J. Givens
BY
E J Hardway,
ATTORNEY

Patented Mar. 31, 1953

2,633,326

UNITED STATES PATENT OFFICE 2,633,326

VALVE

Perry J. Givens, Houston, Tex., assignor to
R. O. Stekoll, Houston, Tex.

Application March 6, 1946, Serial No. 652,394

2 Claims. (Cl. 251—97)

This invention relates to a valve; and has particular relation to a valve of the plug, or stopcock, type.

An object of the invention is to provide a valve of the character described which will withstand very high pressure and at all times maintain a positive seal.

Another object of the invention is to provide a valve of the character described embodying a valve casing having a passageway therethrough with a resilient tapered sleeve inserted into the casing and having openings therethrough aligned with said passageway, and a metal plug fitted into said resilient sleeve and having a passageway therethrough which may be turned into and out of alignment with the passageway through the casing; said resilient sleeve being provided with metal rings around the openings of the resilient sleeve which fit through said openings and extend into the casing and which prevent the flow of the material of the resilient sleeve when pressure is exerted on the valve, to the end that the material of the sleeve may not escape through the passageway when the valve is subjected to high pressure.

It is a further object of the invention to provide a valve of the character described which is so constructed that when the plug is turned about its longitudinal axis to closed position it will also move inwardly so as to place the resilient sleeve under additional compression and when the plug is turned, about said axis, to open position it will move axially in the other direction.

A still further object of the invention is to provide a valve of the character described wherein the tapered plug, when in closed position, fits snugly at all points of contact with the flanged surfaces or seats of said metal rings and when the valve is closed and the resilient sleeve is under pressure it will be caused to seal any small openings that may exist between the flanges of said rings and metal plug, or between the walls of the valve body, and the surface of the rings.

Other objects and advantages of the invention will be apparent from the following specification which is illustrated by the accompanying drawings, wherein.

Figure 1:
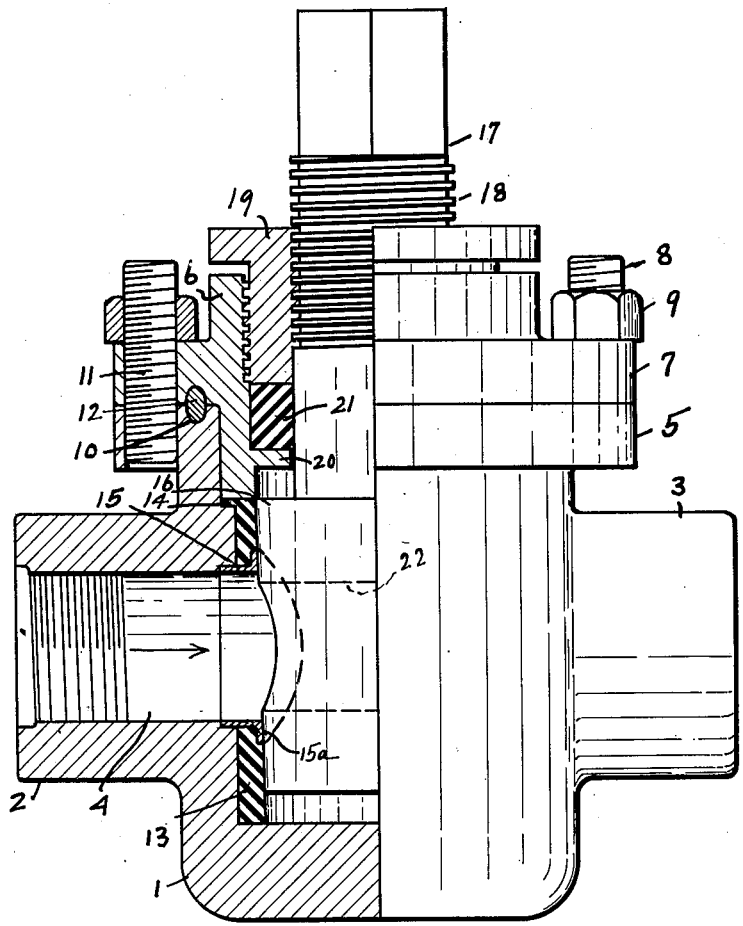
Figure 1 is a side view of the valve, partly in section, showing the valve in open position.
Figure 2:
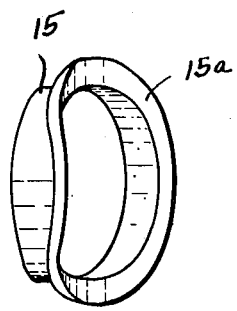
Figure 2 is a perspective view of a metal seal ring employed.

Referring now more particularly to the drawings wherein like numerals of reference designate the same parts in each of the figures, the numeral 1 designates the valve casing which has the connections 2, 3 for adjacent sections of a flow line. This casing has a passageway 4 therethrough for the flow of fluid, flowing through the line.

The valve casing or body is closed at one end and is open at the other end and provided with the external annular flange 5.

A gland 6 is fitted into the open end of the valve casing and is provided with an external annular flange 7 which registers with the flange 5 and may be secured thereto in any preferred manner as by the bolts 8 and the clamp nuts 9 threaded thereon.

The flanges 5, 7 have the registering annular grooves 10, 11 to receive the seal ring 12.

Figure 3:
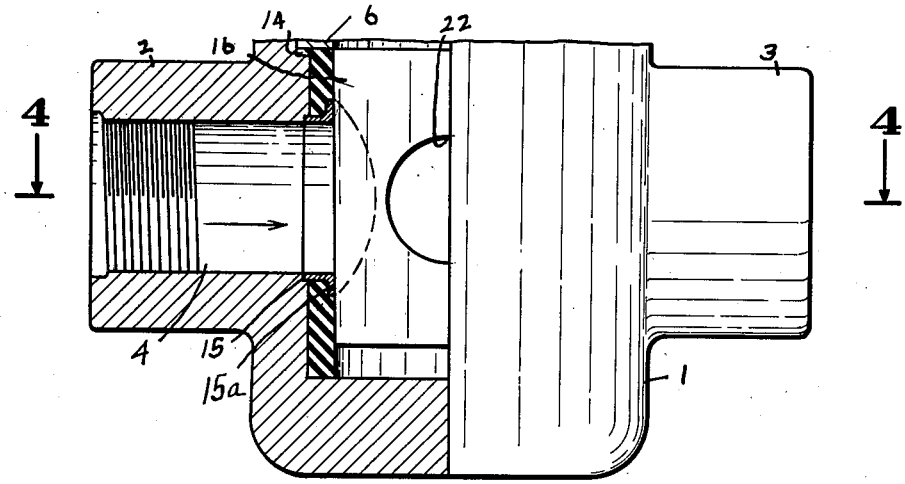
Figure 3 is a fragmentary side elevation of the assembly showing the valve closed.

Fitted within the valve casing there is a resilient sleeve 13 which is preferably formed of rubber, or other similar material, and one end of which fits closely against the closed end of the casing and whose other end has an external annular flange 14 which is clamped between the inner end of the gland 6 and the opposing part of the casing, as clearly shown in Figures 1 and 3.

The inner side of the valve sleeve 13 converges, or tapers, toward the closed end of the casing and the passageway 4 continues through said seat and the openings on opposite sides of the seat are surrounded by metal rings 15 which fit snugly through the sleeve openings and whose outer ends are countersunk into the casing, the inner surfaces of said rings being flush with the walls of the passageway 4, as illustrated in Figures 1 and 3.

Each ring 15 has an annular flange 15a at its inner end which surrounds and fits closely against the adjacent margin of the sleeve 13, as shown in Figure 1, and which is curved to conform to the curvature of said sleeve. The external surface of the sleeve is substantially cylindrical and fits closely within the valve casing 1.

Fitted closely within the sleeve there is a plug 16 which is tapered, externally, to conform to the taper of said sleeve, and is fixed to the inner end of a valve stem 17, a section of which is provided with the coarse external threads 18. The flanges 15a are curved to also conform to the curvature of the plug 16 thus forming seats and providing a metal to metal contact with said plug.

Threaded into the outer end of the gland 6 there is a ring nut 19 through which the stem 17 is threaded.

The inner end of the gland 6 has an inwardly extended annular flange 20 which is spaced from the corresponding end of the plug 16 and the opposite end of the plug is spaced from the opposing end of the casing.

Surrounding the valve stem and mounted on the flange 20 there is an annular packing 21 which is maintained under the required compression by the ring nut 19 so as to prevent leakage past the stem.

The plug 16 has a fluid passageway 22 therethrough which may be turned into and out of alignment with the passageway 4 by giving the plug a quarter turn.

When the plug 16 is turned to closed position the threads of the stem 18 and nut 10 will cooperate to force said plug slightly inwardly thus placing under compression the sleeve 13, and forcing the rings 15 outwardly, so as to form a fluid tight joint all the way around the valve.

Figure 4:
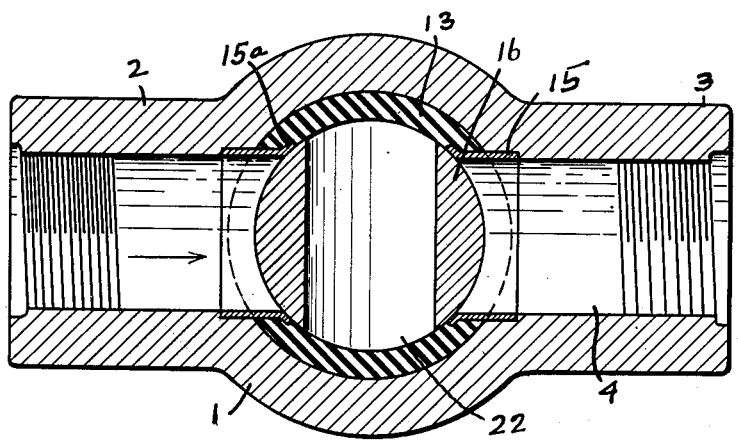
Figure 4 is a transverse sectional view taken on the line 4—4 of Figure 3.

When the plug is turned to closed position, as shown in Figures 3 and 4, pressure of the fluid on the upstream side will be exerted against the plug and said plug will be moved laterally and will press the resilient material of the sleeve closely against the opposing ring 15 so as to form an efficient seal.

It is obvious that when the plug 16 is turned in the other direction to open position the threads of the stem 18 and nut 19 will co-operate to move the plug slightly outwardly thus allowing the resilient sleeve to contract slightly inwardly.

The drawings and description are illustrative merely while the broad principle of the invention will be defined by the appended claims.

What I claim is:

1. A valve of the plug, or stopcock, type comprising, a valve casing, a resilient internally tapered sleeve in said casing, said casing and sleeve having a passageway therethrough, a plug whose external surface tapers to conform to the internal taper of the sleeve, said plug fitted into the sleeve and having a passageway therethrough which registers with the passageway through the casing when the plug is turned to open position and which is misaligned with the casing passageway, when the plug is turned to another position, means operatively connecting the plug and casing and effective to move the plug axially to place the sleeve under compression to seal all openings inside the valve casing, when the plug is turned to closed position metal rings surrounding the passageway and extending into the casing and sleeve, annular outwardly turned flanges on the inner ends of said rings conforming to the contour of and seating against the outer surface of the plug.

2. A valve comprising, a casing, a tubular, resilient, tapered sleeve fitted therein whose inner wall tapers from one end inwardly, a plug fitted into the sleeve and whose external surface tapers to conform to the taper of the inside of the sleeve, said casing, sleeve and plug having a passageway therethrough for the flow of fluid, means operatively connecting the plug and casing and effective to move the plug axially in the sleeve, said plug being turnable to one position to close said passageway and metal rings in the sleeve having annular outwardly turned portions at their inner ends forming seats around the sleeve openings whose inner surfaces conform to the contour of, and fit closely against, the plug all the way around said openings, said rings extending through the sleeve openings and into the casing around the passageway through the casing and another to position to open the passageway.

PERRY J. GIVENS.

REFERENCES CITED

The following references are of record in the file of this patent:

UNITED STATES PATENTS

| Number | Name | Date |
|---|---|---|
| 924,270 | Paterson | June 8, 1909 |
| 934,614 | Huxley | Sept. 21, 1909 |
| 1,849,580 | Klinger | Mar. 15, 1932 |
| 1,946,745 | Johnston | Feb. 13, 1934 |
| 2,210,335 | Mueller | Aug. 6, 1940 |
| 2,424,210 | Sutton | July 15, 1947 |

FOREIGN PATENTS

| Number | Country | Date |
|---|---|---|
| 11,111 | Australia | of 1933 |
| 13,188 | Great Britain | of 1850 |
| 538,129 | Germany | of 1930 |
| 655,217 | Germany | of 1938 |